United States Patent [19]
McMaster

[11] 3,936,291
[45] Feb. 3, 1976

[54] GLASS SHEET TEMPERING BLASTHEAD

[76] Inventor: Harold A. McMaster, 707 Riverside Drive, Woodville, Ohio 43469

[22] Filed: Jan. 20, 1975

[21] Appl. No.: 542,326

Related U.S. Application Data

[63] Continuation-in-part of Ser. No. 280,617, Aug. 14, 1972, abandoned, and a continuation-in-part of Ser. No. 435,130, Jan. 21, 1974, abandoned, which is a continuation-in-part of Ser. No. 365,939, June 1, 1973, abandoned.

[52] U.S. Cl. .................................. 65/351; 65/273
[51] Int. Cl.² ......................................... C03B 27/00
[58] Field of Search ............. 65/273, 274, 348, 349, 65/350, 351

[56] References Cited
UNITED STATES PATENTS

| | | | |
|---|---|---|---|
| 165,302 | 7/1875 | Butler | 137/247.49 |
| 1,281,883 | 10/1918 | Toof | 15/229 |
| 1,678,744 | 1/1928 | Olsen | 29/157 |
| 2,108,209 | 2/1938 | Reilly | 228/175 |
| 2,134,797 | 11/1938 | Owen | 65/349 |
| 2,178,520 | 10/1939 | Howard | 65/115 |
| 2,263,679 | 11/1941 | Ferre | 65/348 |
| 2,298,119 | 10/1942 | Gebert | 141/388 |
| 2,329,938 | 9/1943 | Ortiz | 228/170 |
| 2,467,911 | 4/1949 | Reilly | 285/163 |
| 2,473,139 | 6/1949 | Dickerman | 277/24 |
| 2,488,807 | 11/1949 | Currie | 165/78 |
| 2,559,413 | 7/1951 | Dungler | 34/156 |
| 2,713,195 | 7/1955 | Hemmer | 29/157 |
| 2,724,215 | 11/1955 | Gilstrap | 65/348 |
| 2,759,254 | 8/1956 | Soehnlen et al. | 29/428 |
| 3,086,559 | 4/1963 | Grenell | 138/157 |
| 3,294,519 | 12/1966 | Fickes | 65/348 |
| 3,301,312 | 1/1967 | Buns | 158/116 |
| 3,339,322 | 9/1967 | Kraus | 52/208 |
| 3,353,946 | 11/1967 | McMaster | 65/348 |
| 3,362,086 | 1/1968 | McLean | 34/99 |
| 3,499,720 | 3/1970 | Flynn | 431/349 |
| 3,502,357 | 3/1970 | Wagner | 287/54 |

FOREIGN PATENTS OR APPLICATIONS

| | | | |
|---|---|---|---|
| 773,469 | 4/1957 | United Kingdom | 65/348 |
| 436,245 | 7/1948 | Italy | 65/348 |

Primary Examiner—Arthur D. Kellogg
Attorney, Agent, or Firm—Reising, Ethington, Barnard, Perry & Brooks

[57] ABSTRACT

A glass tempering blasthead including a pair of plenum chambers with opposed banks of nozzles for directing air or other fluid flow onto opposite surfaces of a sheet of glass disposed therebetween for quenching or cooling the glass subsequent to heat treatment of the glass. Each plenum chamber has a fluid flow distributing assembly including a pair of complementary sheet members. Each of the sheet members is stamped so that when secured in complementary relationship with the other sheet member a series of nozzles are formed having flared inlets communicating with a transverse feed passage for directing flow from the plenum chamber into the flared inlets of the nozzles. When the glass sheets are disposed horizontally between the opposed nozzles, the nozzles have their axes disposed parallel to the vertical. When the glass sheets are disposed vertically between the opposed nozzles, the nozzles are inclined downwardly to drive the heat and spent air downwardly off the bottom of the glass sheet and to better maintain a pressure balance on the opposite surfaces of the glass sheet. Further, the nozzles located adjacent the upper ends of the plenum chambers are inclined downwardly at a greater angle than the remaining nozzles to direct the flow therefrom away from the carrier of the glass sheet to reduce the likelihood of heat distortion of the carrier. The vertically disposed blasthead is supported in such a manner that it reciprocates during a quenching operation to apply uniform cooling temperature to the opposite surfaces of the sheet. In order to prevent contamination of the fluid flow from the nozzles, a dry, rolling seal is provided between the plenum chamber and the supply ducts to the plenum chambers.

18 Claims, 11 Drawing Figures

GLASS SHEET TEMPERING BLASTHEAD

This application is a continuation-in-part of application Ser. No. 280,617, filed Aug. 14, 1972, now abandoned, and of application Ser. No. 435,130, filed Jan. 21, 1974, the latter application Ser. No. 435,130 being a continuation-in-part of application Ser. No. 365,939, filed June 1, 1973 now abandoned. The entire disclosures of application Ser. No. 280,617, filed Aug. 14, 1972, now abandoned; application Ser. No. 435,130, filed Jan. 21, 1974; and application Ser. No. 365,939 now abandoned, filed June 1, 1973, are incorporated herein by reference.

BACKGROUND OF THE INVENTION

1. Field of the Invention

This invention relates generally to apparatus for tempering glass, and is particularly concerned with apparatus of the type, sometimes referred to as "blastheads," in which air or other cooling fluid under pressure is directed onto opposite surfaces of a sheet of glass subsequent to heating of the glass for quenching or rapidly cooling the sheet of glass.

2. Description of the Prior Art

The tempering of glass sheets by first heating the sheet and then suddenly cooling the heated sheet increases the mechanical strength of the glass sheet, which, in and of itself, increases the safety and the use of the glass. In addition, however, the safety is increased because the tempered glass, when broken, disintegrates and shatters into small, relatively dull and harmless particles instead of into large, sharp slivers as is the case with untempered glass.

Conventional glass tempering processes include systems wherein untempered glass sheets are first conveyed into a furnace and heated to a desired temperature, after which the heated glass sheets are conveyed to a quenching apparatus wherein the temperature of the glass is rapidly reduced to complete the tempering process. Conventionally, the quenching apparatus is of the type sometimes referred to as a "blasthead" wherein air, or other fluid, under pressure, is directed from nozzles onto opposite surfaces of the glass sheet to cool the glass.

Typically, blastheads include a pair of plenum chambers with opposed banks of nozzles projecting from the respective plenum chambers for directing air under pressure onto opposite surfaces of a sheet of glass disposed between the opposed banks of nozzles. It is, of course, important with this type of apparatus to maintain uniform flow and pressures through the nozzles from the respective plenum chambers — it being highly undesirable to subject the heated glass sheet to any significant variation in pressure over its surface.

In some systems, the glass sheets are disposed in a horizontal plane as they are conveyed through the quenching apparatus, in which case, one plenum chamber is disposed above the other, with the lower plenum chamber having upwardly directed nozzles, and the upper plenum chamber having downwardly directed nozzles so that the upwardly and downwardly directed nozzles respectively direct fluid flow onto the lower and upper surfaces of the glass sheets. See, for example, U.S. Pat. No. 2,188,401.

In other systems, the untempered glass sheets are suspended in a vertical plane by tongs on a carrier or other conveying element. The vertically disposed sheets are conveyed by the carrier from the furnace to the blasthead. The blasthead plenum chambers are oriented vertically, that is, with their opposed banks of nozzles located on opposite sides of the vertically disposed sheet of glass. See, for example, U.S. Pat. Nos. 2,134,797; 2,146,390; 3,353,946 and 3,402,038.

Particularly in systems in which the glass sheets are disposed vertically for both heat treatment and quenching in a tempering process, the glass sheets are generally conveyed step-by-step through the heat treating furnace and quenching apparatus so that the sheets are, for a time, stationary while disposed between the opposed banks of nozzles of the blasthead. Since the glass sheets are at a high temperature as they move into position between the blasthead nozzles, delivery of high pressure fluid at fixed points on the glass can produce irregularities in the surface of the glass. This condition can be alleviated somewhat by causing the blasthead nozzles to move relative to the stationary glass sheets during the quenching operation. See, for example, U.S. Pat. Nos. 2,263,679 and 2,724,215 wherein the blasthead is caused to oscillate or reciprocate relative to the glass sheet during the quenching operation.

SUMMARY OF THE INVENTION

One of the objects of the present invention is to provide a glass tempering blasthead having a fluid flow distributing assembly in which pairs of complementary sheet members are formed with a series of nozzles each communicating with a transverse feed passage in such a manner that abrupt pressure changes are substantially eliminated as the fluid flows through the nozzle from the plenum chamber to provide a substantially uniform distribution of pressure among the nozzles.

A further object is to provide an improved blast-head or quenching apparatus for cooling glass sheet material and the like uniformly over its entire surface.

A further object is to provide a blasthead having an improved fluid distribution system that can be fabricated from stamped sheet metal or the like wherein a high pressure cooling fluid can be directed onto a glass sheet at substantially uniform pressures over the entire surface of the glass sheet.

A further object is to provide a reciprocating blasthead having improved means for causing reciprocation of the blasthead.

A further object is to provide a reciprocating blasthead having a dry seal between the reciprocating inlet ducts to the blasthead and the discharge duct from a bore or the like to reduce the likelihood of contamination of the cooling fluid as it enters the plenum chamber.

A further object is to provide a reciprocating blasthead for tempering heated glass sheets disposed in a vertical plane as the glass sheets are conveyed between the opposed banks of nozzles of the blasthead, wherein the blasthead nozzles are oriented in such a manner that the cooling fluid is directed away from the supporting carrier for the glass sheets to reduce the likelihood of heat distortion caused by sudden cooling of the carrier.

In carrying out the foregoing, and other objects, a glass tempering blasthead according to the present invention may include a pair of plenum chambers each having fluid flow distributing assemblies providing opposed banks of nozzles for directing cooling fluid onto opposite surfaces of a sheet of glass disposed between the opposed banks of nozzles. The fluid flow distributing assemblies are formed by complementary pairs of stamped sheet members. Each of the sheet members has a free edge spaced from its respective plenum chamber and is formed with a series of depressions spaced from each other by nozzle portions, each of the nozzle portions and depressions extending from the free edge of the respective sheet member with a depression between each adjacent pair of nozzle portions. The inner end of each depression curves away from the free edge of the sheet member as well as the inner ends of the adjacent pair of nozzle portions, and each sheet member is formed with a transverse feed passage portion projecting transversely outwardly from the inner ends of the depressions. The pair of complementary sheet members are joined together such that each depression of one sheet member is in complementary abutting relationship with a depression of the other sheet member, and each nozzle portion of one sheet member is in opposed, complementary relationship with a nozzle portion of the other sheet member to form a nozzle having an outlet at the juxtaposed free edges of the sheet members and a flared inlet defined by the curved inner ends of the depression on opposite sides of the nozzles. The transverse feed passage portions of the sheet members cooperate to define a transverse feed passage projecting from the respective plenum chamber and extending transversely of the nozzles and communicating along its length with the plenum chambers such that abrupt pressure changes between the plenum chamber and inlets of the nozzles is substantially eliminated.

In accordance with other aspects of the invention, a blasthead having vertically disposed opposed banks of nozzles for cooling glass sheets disposed in a vertical plane includes a pair of spaced plenum chambers carried by a yoke member which is supported on a roller mounted eccentrically on a shaft. Rotation of the shaft thereby imparts vertical reciprocating motion to the yoke and plenum chambers. In addition to being supported on the eccentric rollers, the blasthead is suspended by tension springs to provide a smooth reciprocating motion of the blasthead during rotation of the eccentric roller.

The plenum chamber of the vertically disposed blasthead discussed in the preceding paragraph are supplied from overhead blowers, and a novel seal arrangement is provided at the connection between the reciprocating plenum chambers and the fixed blower outlets. A resilient, dry rolling seal is provided to allow a smooth reciprocating motion between the plenum chambers and blower outlets, and to prevent contamination of the fluid entering the plenum chamber of the type that could possibly result from lubricant or the like.

The nozzles of the vertically disposed, reciprocating blasthead are inclined downwardly so that when a sheet of glass is removed from the furnace and disposed in the space between the opposed banks of nozzles, the heated sheet of glass is bathed uniformly over its surface by the reciprocating motion of the plenum chambers, and the downward inclination of the nozzles directs the fluid downwardly to center the glass sheet between the two sets of nozzles. A damper is provided to regulate the pressure from the blower so that the pressure in the plenum chambers is equalized.

Other objects, advantages and features of the invention will become apparent from the following description, taken in connection with the accompanying drawings.

DESCRIPTION OF THE DRAWINGS

FIG. 7b is an elevational view of the blower portion of the blasthead of FIG. 7a;

FIG. 8 is a view taken along lines 8—8 of FIG. 7a;

FIG. 9 is a sectional view taken along lines 9—9 of FIG. 8; and

FIG. 10 is an enlarged detailed view of the area enclosed by the circle 10 in FIG. 7a illustrating the dry rolling seal provided at the connection between the reciprocating plenum chambers and the fixed blower outlets.

DESCRIPTION OF THE PREFERRED EMBODIMENTS

Figure 1:
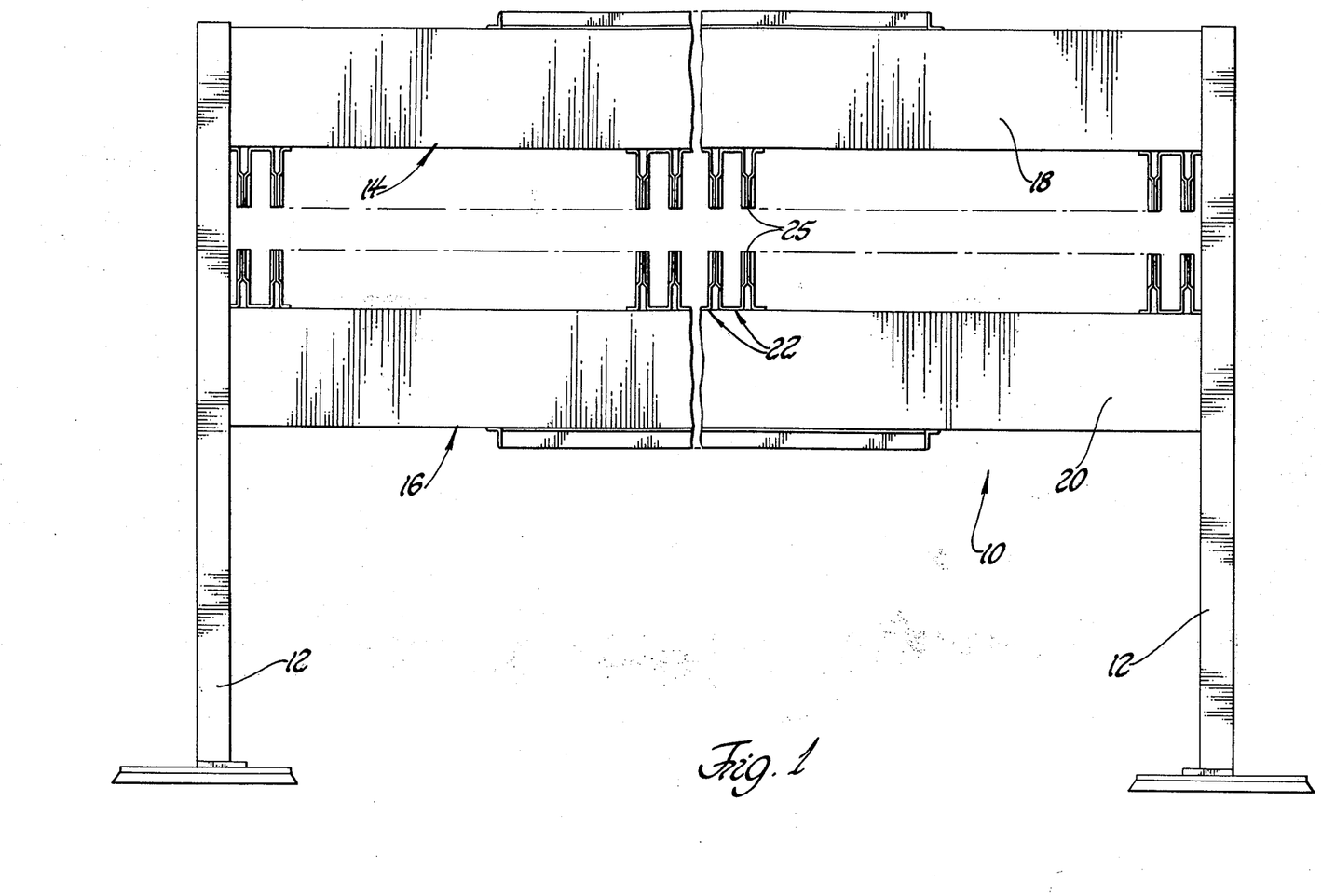
FIG. 1 is an elevational view of a glass tempering blasthead according to the present invention, the blasthead of FIG. 1 being of the type wherein glass sheets are disposed in a horizontal plane between the opposed nozzles of the blasthead.

In FIG. 1, reference numeral 10 collectively designates a glass tempering blasthead having opposed upper and lower assemblies 14 and 16, respectively. The upper and lower assemblies 14 and 16 are supported in spaced, opposed relationship on a frame structure that includes the vertical structural members indicated by reference numeral 12 in FIG. 1.

The assemblies 14 and 16 include plenum chambers 18 and 20, respectively, each having fluid flow distributing assemblies providing opposed banks of nozzles 25 for directing air or other cooling fluid onto the opposite surfaces of a sheet of glass disposed in a horizontal plane between the opposed banks of nozzles 25. Various conventional means (not shown) but which are known in the prior art may be utilized for supporting sheets of glass horizontally in the space between the opposed banks of nozzles 25. For example, the glass sheets may be floated on gases, or supported on rollers.

Figure 2:
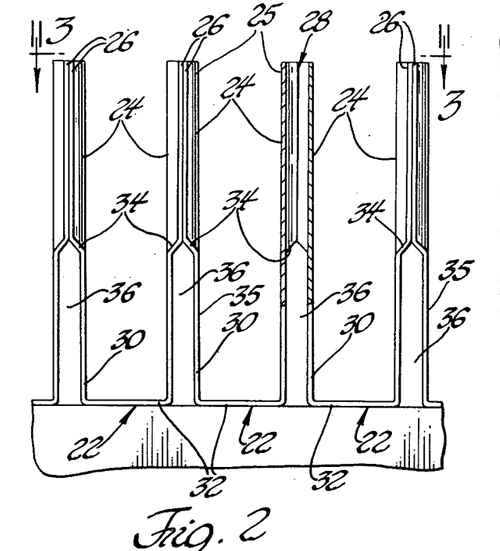
FIG. 2 is an enlarged fragmentary cross-sectional view of a portion of the fluid distribution system of the blasthead of FIG. 1.
Figure 3:
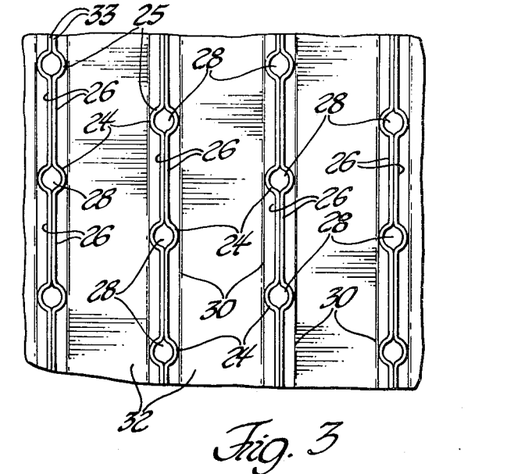
FIG. 3 is a fragmentary view taken on lines 3—3 of FIG. 2.

The fluid flow distributing assemblies of the plenum chambers 18 and 20 are made up of basic sheet metal components indicated by reference numeral 22 in the drawings. With reference to FIGS. 2 through 6, each of the sheet metal components 22 is of general U-shape in cross-section and includes a bottom or base portion 32 with spaced parallel sheet-like leg portions 30 projecting from opposite side edges of the base portion 32. Formed in each of the sheet-like leg portions 30 is a series of arcuate passage or nozzle portions 24 spaced from each other by flat depressions 26. When the sheet-like leg member 30 of one of the components 22 is disposed in opposed, complementary relationship with the sheet-like leg member 30 of another component 22, each depression 26 of one of the leg members abuts a depression 26 of the other leg member, and each of the nozzle portions 24 of one leg member cooperates with a nozzle portion 24 of the other leg member to form the nozzles 25 having elongated passages 28. As shown in FIGS. 2 and 3, the components 22 extend across the side walls of the respective plenum chambers with their leg portions 30 in opposed, complementary relationship such that the base portions 32 define the walls or faces of the plenum chambers from which the nozzles 25 project.

The depressions 26 formed in the sheet-like, or plate-like leg portions 30 are offset from the plane of the leg portions so that each depression 26 of one leg portion 30 abuts a depression of the opposed, complementary leg portion 30 of the adjacent component 22. The abutting depressions 26 extend between the adjacent nozzles 25 which are defined by the complementary passage or nozzle portions 24 in the opposed, complementary leg portions 30 of the adjacent components 22.

Figure 5:
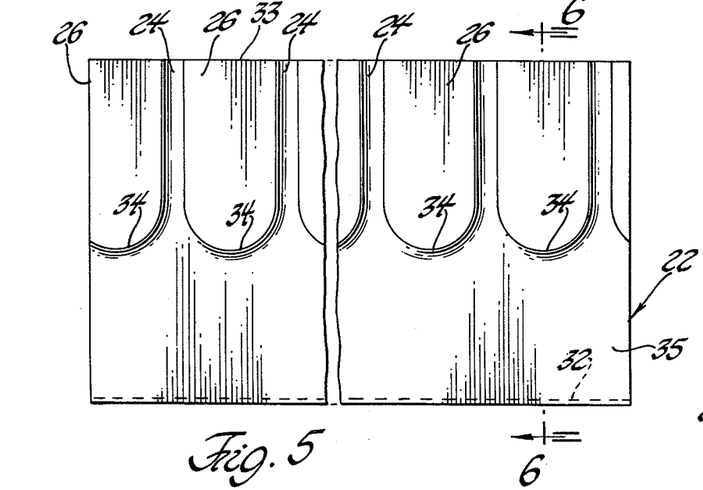
FIG. 5 is an elevational view of the component of FIG. 4 as viewed along lines 5—5 of FIG. 4.
Figure 6:
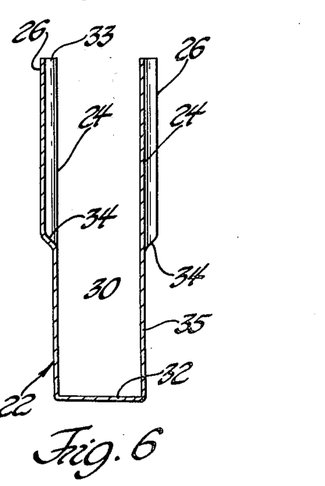
FIG. 6 is a sectional view taken on lines 6—6 of FIG. 4.

As shown particularly in FIGS. 2, 5 and 6, the depressions 26 extend inwardly from the outer free edges 33 of the sheet-like leg members 30 toward the bottom or base portion 32. The depressions 26 each have inner ends 34, the inner end 34 of each depression curving away from the free edge 33 as well as the inner ends of the adjacent pair of nozzle portions 24. Consequently, when the leg portion 30 of one component 22 is joined together in complementary relationship with the leg portion 30 of another component 22, nozzles 25 are formed by the nozzle portions 24, each having a passage 28 with an outlet at the juxtaposed free edges 33 of the complementary leg members 30, and a flared inlet defined by the curved inner ends 34 of the abutting depressions 26 on opposite sides of each nozzle 25.

Each of the leg portions 30 has a transverse feed passage portion 35 defined between the inner ends 34 of the depressions 26 and the base portion 32. The feed passage portion 35 of one of the sheet-like leg members 30 cooperates with the feed passage portion 35 of its complementary leg portion 30 to define a transverse feed passage 36 projecting from the plenum chamber and extending transversely of the nozzles 25. The transverse feed passage 36 communicates along its length with the plenum chamber and the inlet ends of the nozzles for transmitting fluid flow from the plenum chamber into the flared inlets of the nozzles 35. The flared inlets defined by the arcuate inner ends 34 of the depressions 26 reduces turbulence in the flow of fluid from the plenum chamber into the passages 28 of the nozzles.

Each of the sheet metal components 22 is made of metal and adjacent pairs of the components 22 are joined together by welding the abutting depressions 26 together along the upper extremities at the free edge 33 of the leg portions 30, and between the adjacent nozzle or passage portions 24 so as to effect a seal along the edges of the nozzles to prevent fluid flow between the abutting depressions 26 of adjacent leg members 30.

Figure 4:
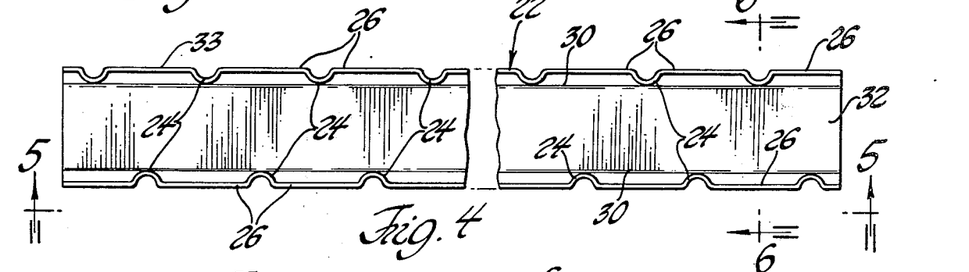
FIG. 4 is a plan view of a stamped sheet metal component using the assembly shown in FIGS. 2 and 3.

As best illustrated in FIGS. 4–6, the depressions 26 are offset outwardly from the plane of the respective leg portions 30 so as to extend outwardly from the space between the leg portions 30 of each component 22. Consequently, when the free edges 33 of complementary leg portions of adjacent components 22 are juxtaposed, the depressions 26 of the leg portion 30 of one component 22 will abut a depression 26 of the complementary leg portion 30 of the adjacent component 22 with the nozzles or passage portions 24 aligned with one another in complementary relationship to define the nozzles and fluid passages 28 spaced from one another by the depressions 22.

Each of the sheet metal components 22 is fabricated by stamping or otherwise forming the spaced, offset depressions 26 along opposite edges of a sheet member or plate and thereafter bending the sheet member along spaced parallel lines, which spaced parallel lines define the junction between the base or bottom 32 and the leg portions 30.

A plurality of the sheet metal components 22 may be associated with one another to form a plurality of vertically disposed or horizontally disposed rows of nozzles 25 having passages 28 for directing gases or fluid against a sheet of glass. The plenum chambers 18 and 20 have side walls interconnected by a top wall in the case of plenum chamber 18 and interconnected by the bottom wall in the case of plenum chamber 20. A plurality of the sheet metal components 22 extend between the side walls of the plenum chamber and the base portions or bottom portions 32 of the components close the space of each plenum chamber so that fluid within the plenum chamber flows through the transverse feed passages 36 between adjacent leg portions 30 and out through the passages 28 of the nozzles 25 as defined by the nozzle portions 24 of adjacent components 22. Among the advantages attained by the fluid flow distributing assembly illustrated in FIGS. 1–6 are the low cost of fabrication resulting from the fact that the components 22 may be stamped out of sheet metal and quickly and easily assembled together, and the significant strength provided by the abutting depressions 26 making it difficult to bend or change the position of the nozzles 25 from the position at which they are formed. Furthermore, broken glass may be easily cleaned from the channels formed between the adjacent rows of nozzles by the leg portions 30.

FIGS. 7a through 10 illustrate a glass tempering blasthead having a pair of plenum chambers with opposed, vertically disposed banks of nozzles for directing air or other cooling fluid onto opposite surfaces of a sheet of glass disposed in a vertical plane between the nozzles. The blasthead in FIGS. 7a through 10 is indicated collectively by reference character B.

Figure 7A:
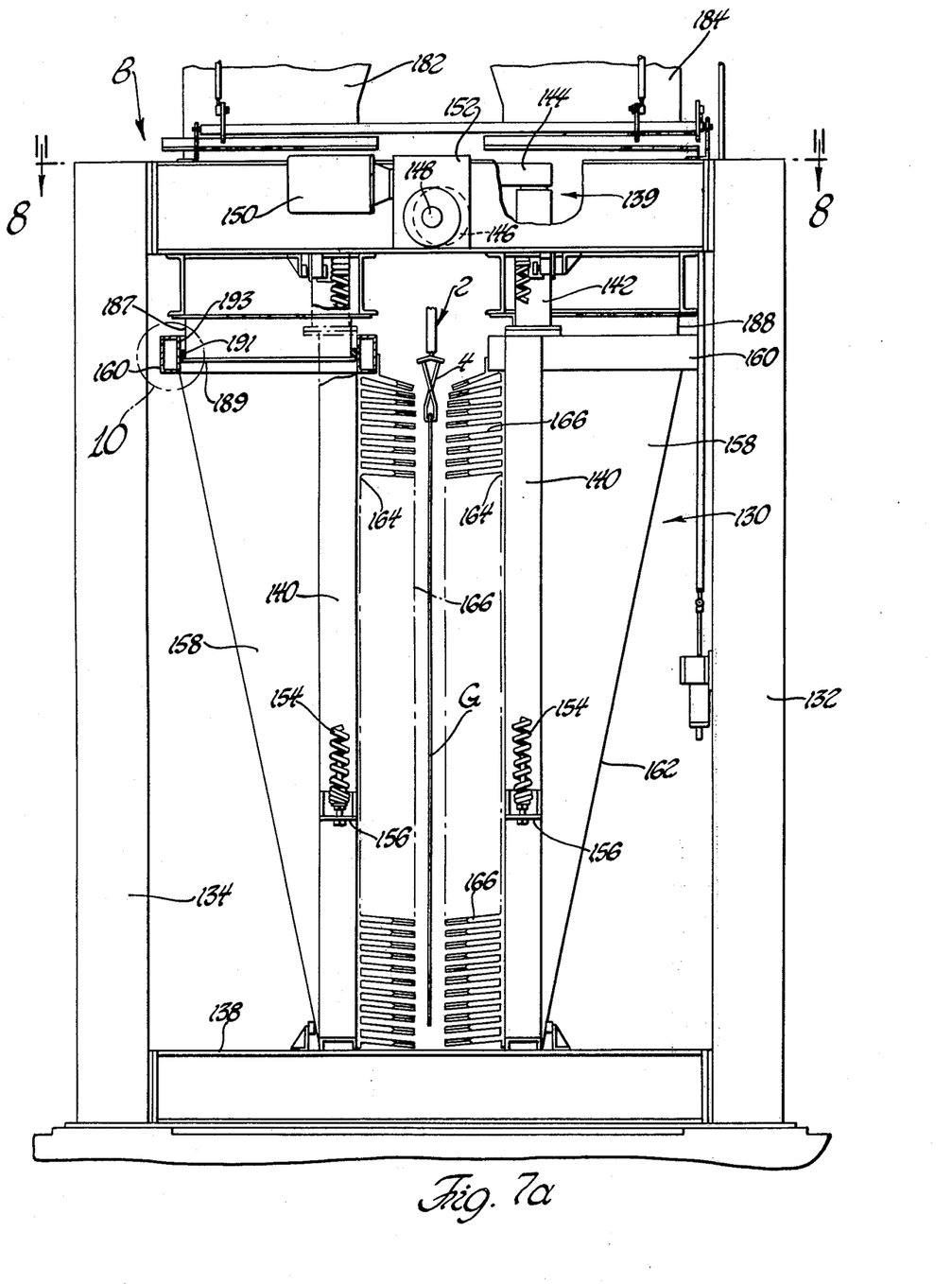
FIG. 7a is an elevational view of a vertically disposed glass tempering blasthead embodying the present invention.
Figure 7B:
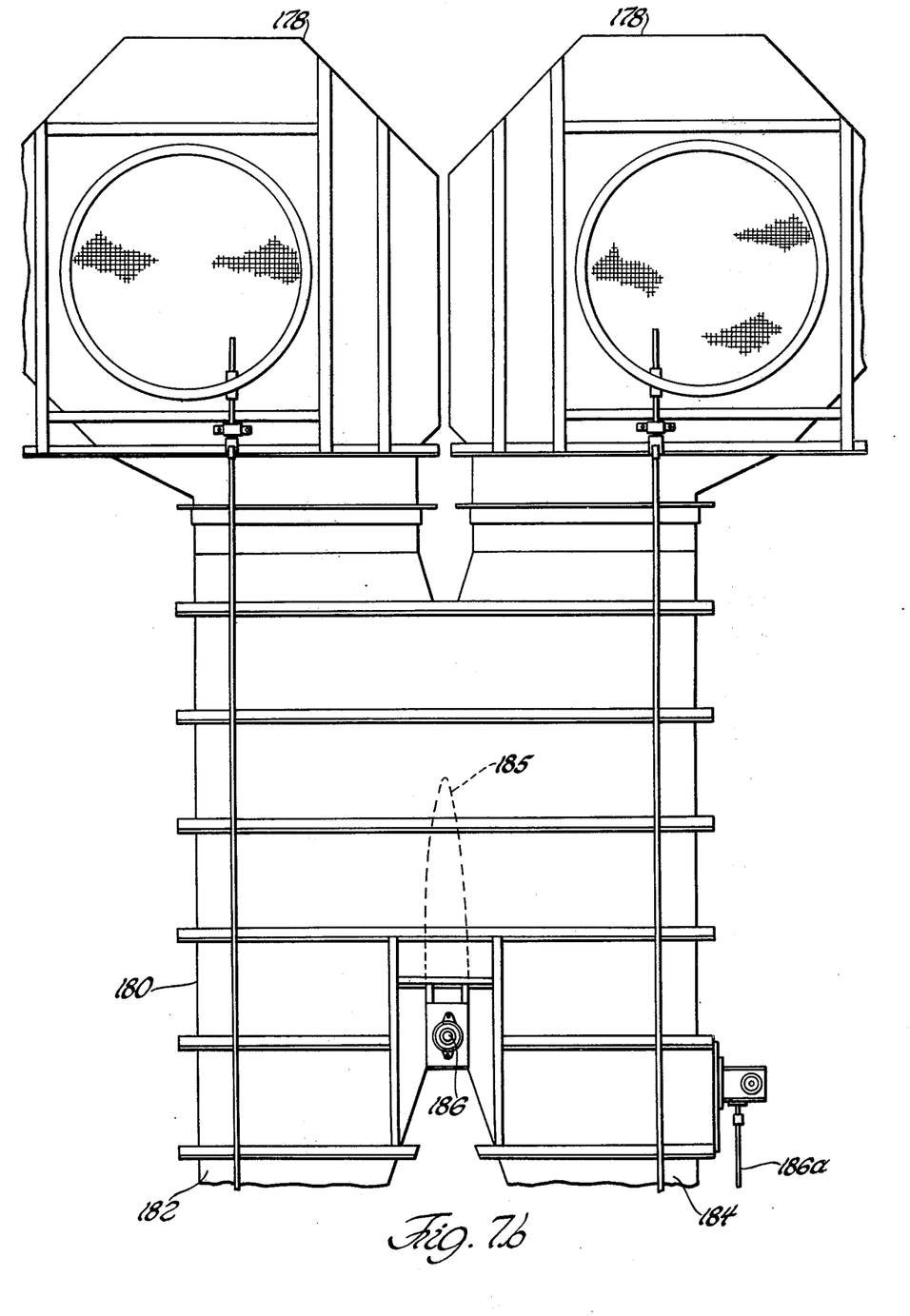

With reference to FIG. 7a, the blasthead B includes a plenum chamber and nozzle assembly designated collectively by reference numeral 130 which is supported for reciprocating movement on a stationary frame. The stationary frame includes spaced upright post members 132 and 134 with an overhead beam 136 extending between the upper ends of the posts. A base member 138 extends between the lower ends of the posts.

The plenum chamber and nozzle assembly 130 includes U-shaped supporting frames or yokes 139 (FIG. 11) as shown in FIG. 10a, each yoke 139 includes a pair of spaced, vertical legs having lower segments 140 secured to upper segments 142, and an upper, horizontal base member 144. The base member 144 of each yoke is supported on an eccentric 146 nonrotatably secured to a shaft 148 driven by a motor 150 through a gear box 152. In addition to being supported on the eccentrics 146, the assembly 130 is suspended from the overhead beam 136 on springs 154 having their upper ends secured to the overhead beam 136 and their lower ends secured to support brackets 156 mounted on the leg members 140 of the yoke.

The assembly 130 further includes a pair of plenum chambers 158 having inclined outer side walls 162 extending downwardly and inwardly from a peripheral rectangular frame or collar member 160, and straight, parallel inner side faces 164. Projecting inwardly from the inner side faces 164 in opposed relationship with each other is a bank or series of nozzle members 166. Each series of nozzle members 166 extends from each inner side face 164 throughout its entire length. Each of the nozzles 166 is inclined downwardly from its respective inner side face 164 and does not extend perpendicularly from its face 164.

As a glass sheet G is moved by a carrier 2 supported on an overhead conveyor (not shown) into the space between the opposed banks of nozzles 166, air or other cooling fluid is impinged onto the sheet G. Rotation of the shaft 148 causes the assembly 130 to reciprocate in a vertical path with respect to the supporting frame due to the engagement of the eccentrics 146 with the upper horizontal base members 144 of the respective yokes 139. Consequently, the nozzles 166 reciprocate at the same time that they are directing jets of cooling fluid onto the sheet G so that the surfaces of the sheet G are uniformly bathed by the cooling fluid and do not create depressions or other distortions in the surface of the sheet G before it hardens. The downward inclination of the nozzles 166 drives the heat and spent air downwardly off the bottom of the sheet G to better maintain a pressure balance on the opposite surfaces of the sheet G to center the glass between the nozzles.

As shown in FIG. 7a, the nozzles 166 at the upper ends of each bank of nozzles have a greater downward inclination than the other nozzles. The air from the upper nozzles does not impinge on the carrier 2 which thus reduces the likelihood of heat distortion of the carrier 2 while it is located in the blasthead.

The entire weight of the assembly 130 including the plenum chambers 158 and the yoke consisting of the members 140, 142 and 144 is not supported on the pair of eccentrics 146. A substantial portion of the weight is carried by the springs 154 to provide a smooth reciprocating motion during rotation of the shaft 148 and eccentric 146.

Figures 8, 9, 10:
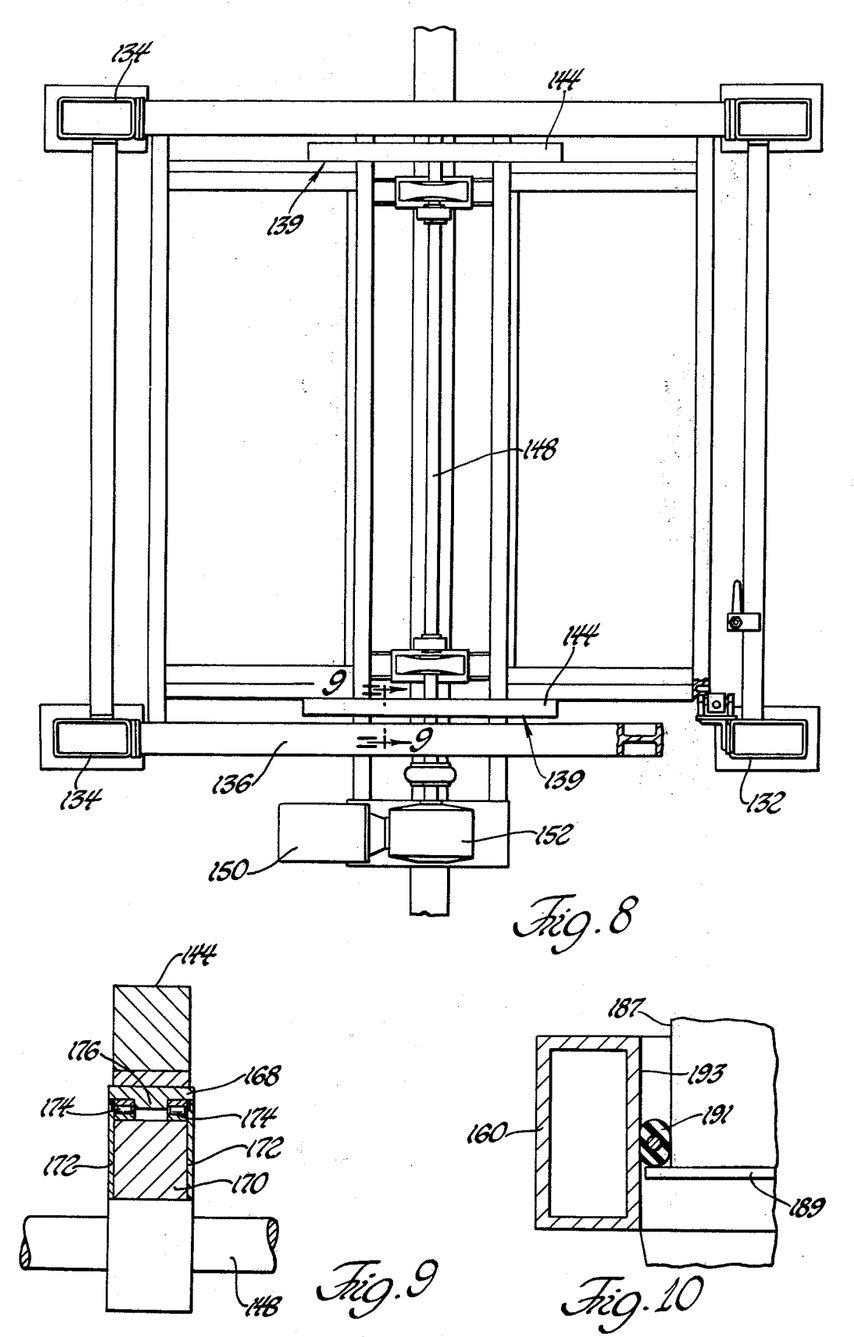

The construction of the eccentrics 146 is illustrated in detail in FIG. 9. Each eccentric includes an assembly including a circular disc 170 fixed to the shaft 148 about an axis eccentric to the circular disc. The disc 170 is rotatably received in a concentric ring member 168 having an inwardly projecting rib 176. Roller bearing assemblies 174 are received between the periphery of the disc 170 and the inner periphery of the ring 168 on opposite sides of the rib 176. The bearing assemblies 174 are held captive by end plates 172, the peripheries of which project beyond the periphery of the disc 170. As the disc 170 rotates with the shaft 148, the horizontal base member 144 of the yoke reciprocates relative to the shaft 148 because of the eccentric relationship between the disc 170 and the shaft 148.

Air is supplied to the plenum chambers 158 by a pair of blowers 178 (FIG. 7b) which, in the illustrated embodiment, are mounted above the blasthead B. The blowers 178 feed into a common duct 180 which then divides into separate ducts 182 and 184. A damper 185 having a shaft 186 with conventional adjustable control means 186a interconnected with shaft 186 provided to maintain equal pressures in the ducts 182 and 184, and hence in the two plenum chambers 158.

Again referring to FIG. 7a, each of the ducts 182 and 184 has an outlet end 187 which is received in the collar 160 defining the upper end of the plenum chamber 158. The outlet end 187 of the duct has an outwardly projecting flange 189, and rolling seal members 191 are received in the space between the outer surfaces of the outlet duct 187 and the inner surface of the plenum chamber. The seal members 191 are in the form of straight rods of metal, such as steel, encased in rubber or other elastomeric material. The seals roll relative to the reciprocating surfaces 187 and 193 without permitting the leakage of pressure. Furthermore, the seal 191 may be a completely dry seal. No oil is required for lubrication which would possibly contaminate the air supply impinged onto the glass sheet G, and to which broken glass particles would stick and damage the seal. FIG. 10 shows an enlarged view of this construction.

While specific forms of the invention have been illustrated and described in the foregoing specification and accompanying drawings, it will be apparent to those skilled in the art that the invention is not limited to the exact construction shown, and that alterations and modifications in the construction and arrangement of parts, all falling within the scope and spirit of the invention, can be made by those skilled in the art.

The embodiments of the invention in which an exclusive property or privilege is claimed are defined as follows:

1. A glass tempering blasthead comprising: a pair of plenum chambers, each of said plenum chambers having fluid flow distributing assemblies providing opposed banks of nozzles for directing cooling fluid onto opposite surfaces of a sheet of glass disposed therebetween, said fluid flow distributing assemblies each including a pair of complementary sheet members, each of said sheet members having a free edge spaced from its respective plenum chamber and being formed with a series of depressions spaced from each other by nozzle portions, each of said nozzle portions and depressions extending inwardly from the free edge of the respective sheet member with a depression between each adjacent pair of nozzle portions, each depression and nozzle portion having an inner end remote from said free edge, the inner end of each depression curving away from said free edge and the inner ends of the adjacent pair of nozzle portions, said sheet members each being formed with a transverse feed passage portion projecting transversely outwardly from the inner ends of said depressions, said pair of complementary sheet members being joined together such that each depression of one sheet member is in complementary abutting relationship with a depression of the other sheet member, and each nozzle portion of one sheet member is in opposed complementary relationship with a nozzle portion of the other sheet member to form a nozzle having an outlet at the juxtaposed free edges of said sheet members and a flared inlet defined by the curved inner ends of the depressions on opposite sides of the nozzle, and said transverse feed passage portions of said sheet members cooperate to define a transverse feed passage projecting from the respective plenum chamber and extending transversely of said nozzles, said transverse feed passage communicating along its length with said plenum chamber and nozzles for transmitting fluid flow from said plenum chamber into the flared inlets of said nozzles each of said plenum chambers having side walls, and further including a plurality of U-shaped components extending across the side walls of the plenum chambers, said U-shaped components having base portions forming the inner faces of the respective plenum chambers and each having a pair of spaced, parallel leg portions projecting from its respective base portions, said leg portions being defined by said sheet members, said components being disposed in side-to-side relationship across the edges of the side walls of the respective plenum chambers such that a leg portion of one component is disposed in complementary relationship with a leg portion of the adjacent components.

2. A glass tempering blasthead as claimed in claim 1 wherein said pair of plenum chambers have spaced, opposed vertical inner faces and said nozzles project from said vertical inner faces, and wherein each of said nozzles is inclined downwardly with respect to the inner faces.

3. A glass tempering blasthead as claimed in claim 2 wherein the nozzles at the upper end of each of said inner faces have a greater downward inclination than the other nozzles.

4. A glass tempering blasthead comprising: a pair of plenum chambers, each of said plenum chambers having fluid flow distributing assemblies providing opposed banks of nozzles for directing cooling fluid onto opposite surfaces of a sheet of glass disposed therebetween; each of said plenum chambers having peripheral walls; said fluid flow distributing assemblies each including a plurality of U-shaped sheet metal components, each of said components having a base portion and a pair of spaced, parallel leg portions extending from the edges of said base portion; the base portions of each of said components extending across the peripheral walls of the respective plenum chamber to form an inner face of said plenum chamber; each of said leg portions having a free edge spaced from its respective base portion and being formed with a series of depressions spaced from each other by arcuate nozzle portions; each of said nozzle portions and depressions extending inwardly from said free edge with a depression formed between each adjacent pair of nozzle portions; each depression and nozzle portion having an inner end remote from said free edge, the inner end of each depression being arcuate and curving away from said free edge as well as the inner ends of the adjacent pair of nozzle portions; said leg portions each being formed with a transverse feed passage portion projecting transversely outwardly from the inner ends of said depressions and located between the inner ends of said depression and said base portion; said components being disposed on said plenum chamber such that each leg portion of one component is in opposed, complementary relationship with the leg portion of another component, said complementary leg portions being joined together such that each depression of one complementary leg portion is in abutting relationship with a depression of the other complementary leg portion and each nozzle portion of one complementary leg portion is in opposed, complementary relationship with the nozzle portion of the other complementary leg portion to form a nozzle having an outlet at the juxtaposed free edges of said complementary leg portions and a flared inlet defined by the curved inner end of the abutting depressions on opposite sides of the nozzle; and said transverse feed passage portions of the complementary leg portions cooperating to define a transverse feed passage projecting from the respective plenum chamber and extending transversely of the nozzles of said complementary leg portions, said feed passage communicating along its length with said plenum chamber and nozzles for transmitting fluid flow from said plenum chamber into the flared inlets of said nozzles.

5. A glass tempering blasthead as claimed in claim 4 wherein said inner faces of said plenum chambers are disposed vertically for directing cooling fluid onto the opposite surfaces of a sheet of glass disposed in a vertical plane between the opposed nozzles of said plenum chambers; and wherein each of said nozzles is inclined downwardly with respect to the inner faces of said plenum chambers.

6. A glass tempering blasthead as claimed in claim 4 wherein the inner faces of said pair of plenum chambers are disposed vertically with the nozzles projecting from said inner faces for directing cooling fluid from said plenum chambers onto opposite surfaces of a sheet of glass disposed in a vertical plane between said nozzles; and wherein each of said nozzles is inclined downwardly with respect to said inner faces, the nozzles at the upper end of each of said inner faces having a greater downward inclination than the other nozzles.

7. A glass tempering blasthead as claimed in claim 6 including a supporting frame, spring means resiliently supporting said plenum chambers on said frame, and means for reciprocating said plenum chambers with respect to said frame.

8. A glass tempering blasthead as claimed in claim 7 wherein each plenum chamber has an open end; and further including a stationary inlet duct received in the inlet end of each plenum chamber; and dry seal means mounted between the relatively reciprocating surfaces of said inlet ducts and the inlet ends of said plenum chambers to prevent leakage therebetween.

9. A glass tempering blasthead as claimed in claim 8 wherein said dry seal means comprises a metal rod encased in elastomeric material.

10. A glass tempering blasthead comprising: a pair of plenum chambers having spaced, opposed vertical inner faces; a series of nozzles projecting from said inner faces for directing fluid from said plenum chambers onto opposite surfaces of a sheet of glass received between said nozzles; a supporting frame; means for reciprocating said plenum chambers with respect to said supporting frame; each of said plenum chambers having an open inlet end of polygonal cross-section; a stationary inlet duct of polygonal cross-section received in the inlet end of each plenum chamber; and a straight dry rolling seal member mounted between each of the relatively reciprocating surfaces of said inlet ducts and inlet ends of said plenum chambers to prevent leakage therebetween.

11. A glass tempering blasthead as claimed in claim 10 wherein said dry seal means comprises a metal rod encased in elastomeric material.

12. A glass tempering blasthead as claimed in claim 10 wherein said dry seal means comprises a rod.

13. A glass tempering blasthead comprising: a pair of plenum chambers having spaced, opposed, vertical inner faces; a series of nozzles projecting from said inner faces for directing fluid from said plenum chambers onto opposite surfaces of a sheet of glass received between said nozzles; a supporting frame; means for reciprocating said plenum chambers with respect to said supporting frame; each of said plenum chambers having an open inlet end; a stationary inlet duct received in the inlet end of each plenum chamber; and dry seal means mounted between the relatively reciprocating surfaces of said inlet ducts and inlet ends of said plenum chambers to prevent leakage therebetween;

and including spring means resiliently supporting said plenum chambers on said frame.

14. A glass tempering blasthead as claimed in claim 13 further including a motor driven shaft mounted on said frame; a pair of eccentrics nonrotatably secured to said shaft and spaced from each other along the length thereof; a pair of yokes, each yoke having a horizontal base member supported on one of said eccentrics and a pair of leg members secured to one of said plenum chambers such that rotation of said shaft causes said yokes and plenum chambers to reciprocate with respect to said frame.

15. A glass tempering blasthead as claimed in claim 14 wherein each eccentric includes a circular disc fixed to said shaft about an axis eccentric to the circular disc; a concentric ring member rotatably receiving said disc; and bearing members located between the opposed surfaces of said disc and rings such that said ring is rotatable with respect to said disc, said ring being in direct contact with said base member of the respective yoke.

16. A glass tempering blasthead as claimed in claim 15 wherein said ring member has an inwardly projecting rib 176 and said bearing assemblies are received between the periphery of said disc and the inner periphery of said ring on opposite sides of said rib; and further including end plates mounted on opposite surfaces of said disc, each of said end plates projecting beyond the periphery of said disc to hold said bearing assemblies captive against axial displacement with respect to said disc and ring.

17. A glass tempering blasthead as claimed in claim 16 further including a pair of blowers for supplying fluid pressure to the inlet ends of said plenum chambers, a common duct; said blowers having their outlets connected with the inlet end of said common duct, and said inlet ends of said plenum chambers being connected with the outlet end of said common duct; and further including a damper in said common duct selectively movable to equalize the pressure in the inlet ducts to said plenum chambers.

18. A glass tempering blasthead comprising a stationary supporting frame having a pair of spaced overhead beams; a motor driven shaft rotatably supported on said overhead beams; an eccentric nonrotatably secured to said shaft; a yoke; said yoke having a base portion supported on said eccentric and a pair of depending leg portions; a pair of plenum chambers; said plenum chambers being supported by the leg members of the yoke; a spring connected between each overhead beam and each plenum chamber for resiliently supporting the plenum chamber with respect to said overhead beam; each of said plenum chambers having an open inlet end; and including a stationary inlet duct received in the inlet end of each of said plenum chambers for conducting air under pressure to said plenum chamber; and dry seal means mounted between the relatively reciprocating surfaces of said inlet ducts and inlet ends of said plenum chambers to prevent leakage therebetween.

* * * * *